No. 655,098. Patented July 31, 1900.
O. L. LEACH.
CUSHION TIRE.
(Application filed May 31, 1900.)

(No Model.)

Witnesses

Inventor
Orville L. Leach,
by H. B. Willson & Co.
Attorneys

UNITED STATES PATENT OFFICE.

ORVILLE L. LEACH, OF PROVIDENCE, RHODE ISLAND.

CUSHION-TIRE.

SPECIFICATION forming part of Letters Patent No. 655,098, dated July 31, 1900.

Application filed May 31, 1900. Serial No. 18,565. (No model.)

*To all whom it may concern:*

Be it known that I, ORVILLE L. LEACH, a citizen of the United States, residing at Providence, in the county of Providence and State of Rhode Island, have invented certain new and useful Improvements in Cushion-Tires; and I do declare the following to be a full, clear, and exact description of the invention, such as will enable others skilled in the art to which it appertains to make and use the same.

The invention has relation to cushion-tires.

The object of the invention is to provide a tire of this character which shall be simple of construction, durable in use, comparatively inexpensive of production, and which will possess all the advantageous qualities of a pneumatic tire of the continuous air-chamber type, while at the same time obviating the objection to such tires in that the present tire is practically indestructible as well as non-puncturable.

With this as well as other objects in view the invention consists in certain features of construction and combination of parts, which will be hereinafter fully set forth.

Figure 1:
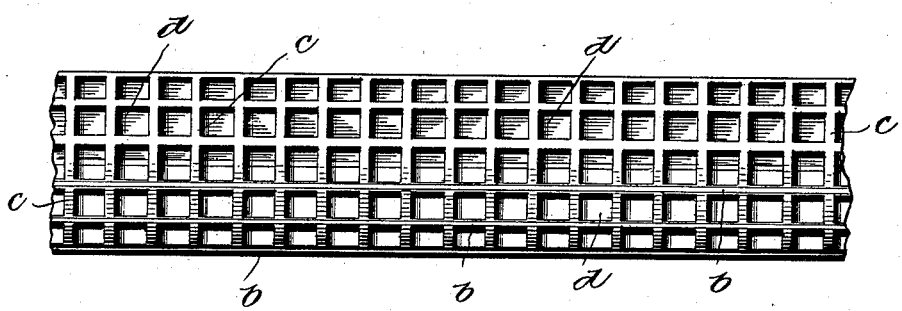
Figure 2:
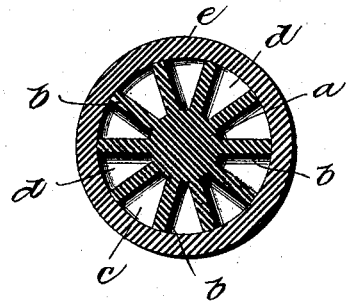

In the accompanying drawings, Figure 1 is a side elevation of a portion of my improved tire, the sheath being removed to more clearly illustrate the construction of the tire; and Fig. 2 is a vertical cross-sectional view through the tire with the sheath in position.

Referring to the drawings, $a$ denotes the core of a tire, which is preferably cylindrical in form and is composed of elastic material, such as rubber. This core may be provided with a longitudinal bore, if desired.

$b$ denotes longitudinal radial wings integral with the core, and $c$ denotes segmental webs arranged at right angles to the wings and connected to said wings and to the core and forming air-cells $d$, which gradually increase in area from their bases outward.

In the manufacture of this tire the parts above described are all molded together.

This tire is adapted to be inclosed within a sheath $e$ of any desired construction.

A tire thus constructed requires no pump, the air contained within the cells performing the desired functions under all circumstances. The tire is light, possesses a large tread, is unobjectionable as to weight, and is absolutely non-puncturable, thus augmenting speed and rendering the locomotion of a vehicle easy, while obviating any bounding or jarring.

All the compression and repulsion of a tire made after my design is local and does not influence the pressure or conditions of any other portion of the tire. Thus there are none of the detrimental results that arise from tires where compression affects the whole length of the tire, as in the case of pneumatic tires with a continuous air-reservoir.

In use when pressure is applied to any part of the tire the sheath closes over the numerous air cells or chambers and prevents the exit of the air from the respective chambers of the tire. If the sheath becomes punctured over one or more of the air-chambers, the resiliency of the cell-walls causes the tire to return to its original contour after compression. When the core is provided with a longitudinal bore, a wire may be passed through said core, or, if desired, in the molding of the tire the wire may be molded directly in the center of the core. Any degree of resiliency in the tire may be obtained by varying the thickness of the cell-walls of the core.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A tire of the type described, comprising a central, longitudinal elastic core, longitudinal parallel wings radiating equidistantly from the core, segmental, parallel, transverse webs connecting said wings and forming therewith annular series of air-chambers open at their outer ends and gradually increasing in area from their bases outward, said core, wings and webs being integrally connected and forming an internal filler, and a sheath inclosing said filler and closing the outer ends of all the air-chambers, said sheath being removably mounted upon the filler, substantially as described.

2. As a new article of manufacture, a filler for the covers or sheaths of pneumatic tires, comprising a central longitudinal core provided with radial longitudinal wings, and transverse webs connecting said wings and forming therewith annular series of air-chambers increasing in area from their bases outward and open at their outer ends, substantially as described.

In testimony whereof I have hereunto set my hand in presence of two subscribing witnesses.

ORVILLE L. LEACH.

Witnesses:
ALVERS R. BENSON,
JAMES R. SHERMAN.